(12) United States Patent
Lipton et al.

(10) Patent No.: US 6,975,345 B1
(45) Date of Patent: Dec. 13, 2005

(54) POLARIZING MODULATOR FOR AN ELECTRONIC STEREOSCOPIC DISPLAY

(75) Inventors: Lenny Lipton, Greenbrae, CA (US); Jeffrey James Hanlon, Richmond, CA (US)

(73) Assignee: StereoGraphics Corporation, San Rafael, CA (US)

( * ) Notice: Subject to any disclaimer, the term of this patent is extended or adjusted under 35 U.S.C. 154(b) by 813 days.

(21) Appl. No.: 09/381,916

(22) PCT Filed: Mar. 27, 1998

(86) PCT No.: PCT/US98/06099

§ 371 (c)(1),
(2), (4) Date: Sep. 24, 1999

(87) PCT Pub. No.: WO98/44746

PCT Pub. Date: Oct. 8, 1998

(51) Int. Cl.[7] .............................................. H04N 13/04
(52) U.S. Cl. ............................. 348/57; 348/51; 348/52; 348/42
(58) Field of Search ....................... 348/42–46, 51–55, 348/58, 59, 57; 345/34, 85–100, 7; 359/23, 465; 349/15, 33, 34; H04N 13/04

(56) References Cited

U.S. PATENT DOCUMENTS

| | | | |
|---|---|---|---|
| 4,281,341 A | | 7/1981 | Byatt |
| 4,333,039 A | | 6/1982 | Strom |
| 4,566,758 A | | 1/1986 | Bos |
| 4,719,507 A | | 1/1988 | Bos |
| 4,792,850 A | | 12/1988 | Lipton et al. |
| 4,884,876 A | | 12/1989 | Lipton et al. |
| 5,552,840 A | * | 9/1996 | Ishii et al. .................. 348/751 |
| 5,739,930 A | * | 4/1998 | Sato et al. ..................... 359/23 |
| 5,796,447 A | * | 8/1998 | Okumura et al. ............. 349/33 |
| 5,917,562 A | * | 6/1999 | Woodgate et al. ............ 349/15 |
| 5,982,538 A | * | 11/1999 | Shikama et al. ............ 359/465 |
| 6,097,352 A | * | 8/2000 | Zavracky et al. .............. 345/7 |
| 6,107,981 A | * | 8/2000 | Fujita ........................... 345/85 |
| 6,184,969 B1 | * | 2/2001 | Ferganson .................. 349/196 |
| 6,201,522 B1 | * | 3/2001 | Erhart et al. .................. 345/96 |

OTHER PUBLICATIONS

Bos et al., "High Performance 3–D Viewing Systems Using Passive Glasses," 1998, SID 88 Digest, pp. 450–453.
Bos et al., "Field–Sequential Stereoscopic Viewing Systems Using Passive Glasses," Proceedings of the SID, vol. 30/1, 1989, pp. 39–43.
Johnson et al., "Stereoscopic Display Performance," Electronic Imaging East Conference, Building Application Solutions with Today's Imaging Tools, 1990, pp. 438–441.

* cited by examiner

*Primary Examiner*—Tung T. Vo
(74) *Attorney, Agent, or Firm*—Dergosits & Noah, LLP; Richard A. Nebb

(57) ABSTRACT

A polarizing modulator for use in an electronic stereoscopic display system having a sequentially scanning display includes a plurality of liquid crystal segments arranged contiguously in a direction of the sequential scan. The liquid crystal material used in each segment has its phase shift tuned to eliminate the perception of a visible line between segments. In a preferred embodiment, the phase shift is tuned by applying a bias voltage to the liquid crystal in its low state.

16 Claims, 4 Drawing Sheets

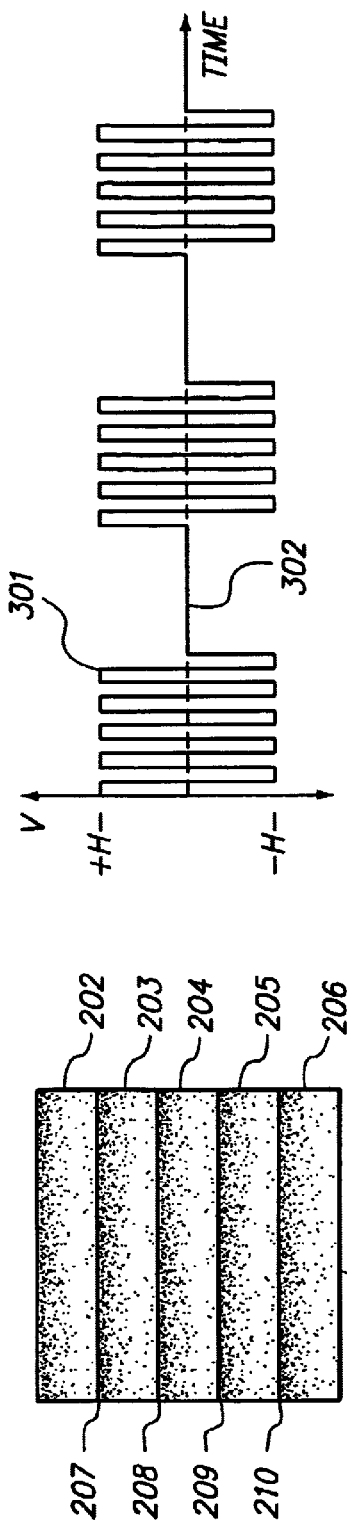
FIG. 3 (PRIOR ART)
FIG. 2 (PRIOR ART)
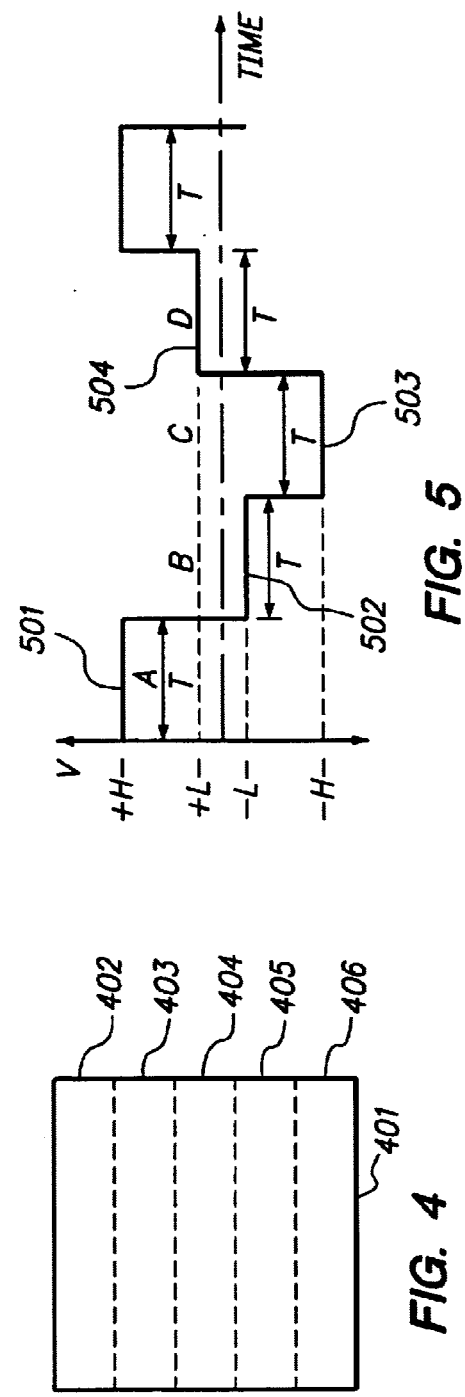
FIG. 5
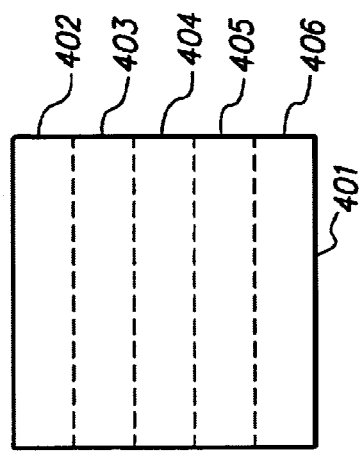
FIG. 4

POLARIZING MODULATOR FOR AN ELECTRONIC STEREOSCOPIC DISPLAY

FIELD OF THE INVENTION

The invention is a liquid crystal ("LC") modulator mounted in front of a cathode ray tube ("CRT") or similar display screen, which switches between left- and right-handed states of circular polarization to display stereoscopic images which are viewed with passive analyzing eyewear. The invention uses a horizontally segmented or Byatt modulator to suppress phosphor afterglow crosstalk, and a unique electronic drive scheme to eliminate the appearance of the individual segments.

BACKGROUND OF THE INVENTION

The seminal disclosure in the field is U.S. Pat. No. 4,281,341 by Byatt. This patent describes the use of a switchable polarizer in combination with a television monitor to produce images which are alternately vertically or horizontally polarized. The switchable polarizer is an LC cell of the twisted nematic type. The most important art disclosed is discussed beginning at column 3, line 26:

> Because liquid crystal cells switch between their two polarization states relatively slowly, it may be desirable to divide each cell into two halves, one half corresponding to the top half of a television picture, the other corresponding to the lower half, so that when the top half of the television raster pattern has been scanned the top half of the liquid crystal cell can be switched into its next required polarization state, so that it has settled into this state by the time that the top half of the raster is required to be scanned on the next frame period. Similarly, the bottom half of the liquid crystal cell would be switched, whilst the top half of the raster pattern is being scanned.

It is this suggestion by Byatt that has made it possible to create an on-screen modulator with desirable performance characteristics. Specifically, Tektronix and its successor NuVision have for a number of years manufactured devices following Byatt's suggestion. In one of the latest versions, five segments are used. These segments are animated, or scanned, in synchronization with the electron beam as the raster progresses from the top to the bottom of the display screen. The principal benefit of this approach is to suppress crosstalk occurring from the phosphor afterglow.

In a timed-multiplex stereoscopic display there are two components responsible for producing crosstalk. One factor is the incomplete occlusion of the shutter, and the other is the afterglow of phosphors into the immediately adjacent field. In addition to the term crosstalk, which implies objective measurement, the terms leakage and ghosting are also used. The term leakage also implies a value derived by measurement. The term ghosting implies an observable but subjective entity.

When products such as CrystalEyes eyewear, manufactured by StereoGraphics Corporation, are used, there is no opportunity to suppress the afterglow component of the alternate field stereo-vision display because LC shutters are used in front of the eyes. These shutters are shuttering out of phase with each other but in synchrony with the video field rate, so that each eye sees only its required image. In this case, if the dynamic range (the ratio of the transmission of the shutter in its open state to the transmission of the shutter in its closed state) of the shutter is sufficiently high, there is little leakage of light through the shutter when it is occluded. However, the eye which is seeing through the open shutter is also seeing a faint or ghostly image of the prior field due to the long decay characteristics of the phosphor set used in monitors for television and computer graphics. In particular, tile green phosphor has the longest visible tail, something which can be easily demonstrated by turning off the appropriate monitor electron gun.

CrystalEyes eyewear uses a high-dynamic-range shutter (typically better than 500:1). However, as already mentioned, the CrystalEyes approach cannot squelch phosphor afterglow. On the other hand, the Byatt modulator is able to do so (as will be explained), but the particular LC device that Byatt suggested, the twisted nematic, has proved to be less useful in this application than the surface-mode device, or π-cell, as it is more commonly called.

There is a body of literature that describes the functioning of the π-cell, and we cite some of it: U.S. Pat. No. 4,884,876 (Lipton et al.); U.S. Pat. No. 4,719,507 (Bos); and U.S. Pat. No. 4,566,758 (Bos). The following are references discussing using a π-cell in the form of a large modulator for field switching: "High-Performance 3-D Viewing Systems Using Passive Glasses" by Bos et al. (p. 450, SID '88 Digest); and "Field-Sequential Stereoscopic Viewing Systems Using Passive Glasses" by Haven (Proceedings of the SID, vol. 30/1, 1989). In addition, Johnson and Bos, in their article "Stereoscopic Display Performance" (ELECTRONIC IMAGING EAST CONFERENCE, Building Application Solutions with Today's Imaging Tools, 1990), describe in detail how the Byatt shutter improves performance in terms of suppression of ghosting created by phosphor afterglow. Because of the existence of this prior art literature, there is little reason to go into the explanation of the physics of the device in great detail.

The multiple-segment Byatt modulator has a noticeable drawback: the segments are visible as individual units, especially when the image contains light-colored neutral backgrounds. Thus, whenever there is texture or an image complexity, the segments are more difficult to see.

The LC cell used for the Byatt device has an LC gap (material thickness) of typically five or six microns. Such cells are coated with a conductor, such as indium tin oxide ("ITO") on the inside surfaces. If a thin line is scribed away from the ITO, leaving dielectric instead of conductor, the electrical continuity is broken and separate electrode segments are produced. Typically, only one of the two facing ITO coatings needs to be so scribed. The scribing can be very thin; so thin, in fact, that hopefully it cannot be seen. We have made parts where the dielectric scribe is 25 microns.

We have established that the scribe is actually not visible, but rather, the source of the segmentation artifact is the change in the shading, or density and coloration, at the boundary line between each segment. The source of this shading is understood and described in the literature cited above. What the observer sees is the density and color change difference between the segments, and each segment appears to stand out as a visible entity in contrast to the immediately adjacent segment. The impression one gets (and it is an optical illusion) is that a thin line separates the segments. The natural conclusion is that the scribed line in the conductor is visible, and that the thinner the scribe, the less visible it will be. However, this is not so. We have produced a scribed line which is five times thicker than the scribed line of the NuVision product, but our segments are invisible, while theirs are visible.

This ability to distinguish segments is a distracting visual artifact. Indeed, this selection device (i.e. modulator plus eyewear) is typically used in high-end applications for scientific visualization or for work in aerospace and the military. The users of such devices do not want to be distracted by the visibility of the individual segments. In fact, it is the principal complaint lodged against this device.

BRIEF DESCRIPTION OF THE DRAWINGS

FIG. 2 illustrates the visibility of the Byatt shutter segments in the prior art.

FIG. 3 illustrates the waveform used to drive prior-art parts, incorporating both a carrier and zero-voltage bias.

FIG. 4 illustrates the invisibility of the individual segments of the present invention.

FIG. 5 is a drawing of the waveform of the drive signal used for the present invention.

DESCRIPTION OF THE INVENTION

Figure 1:
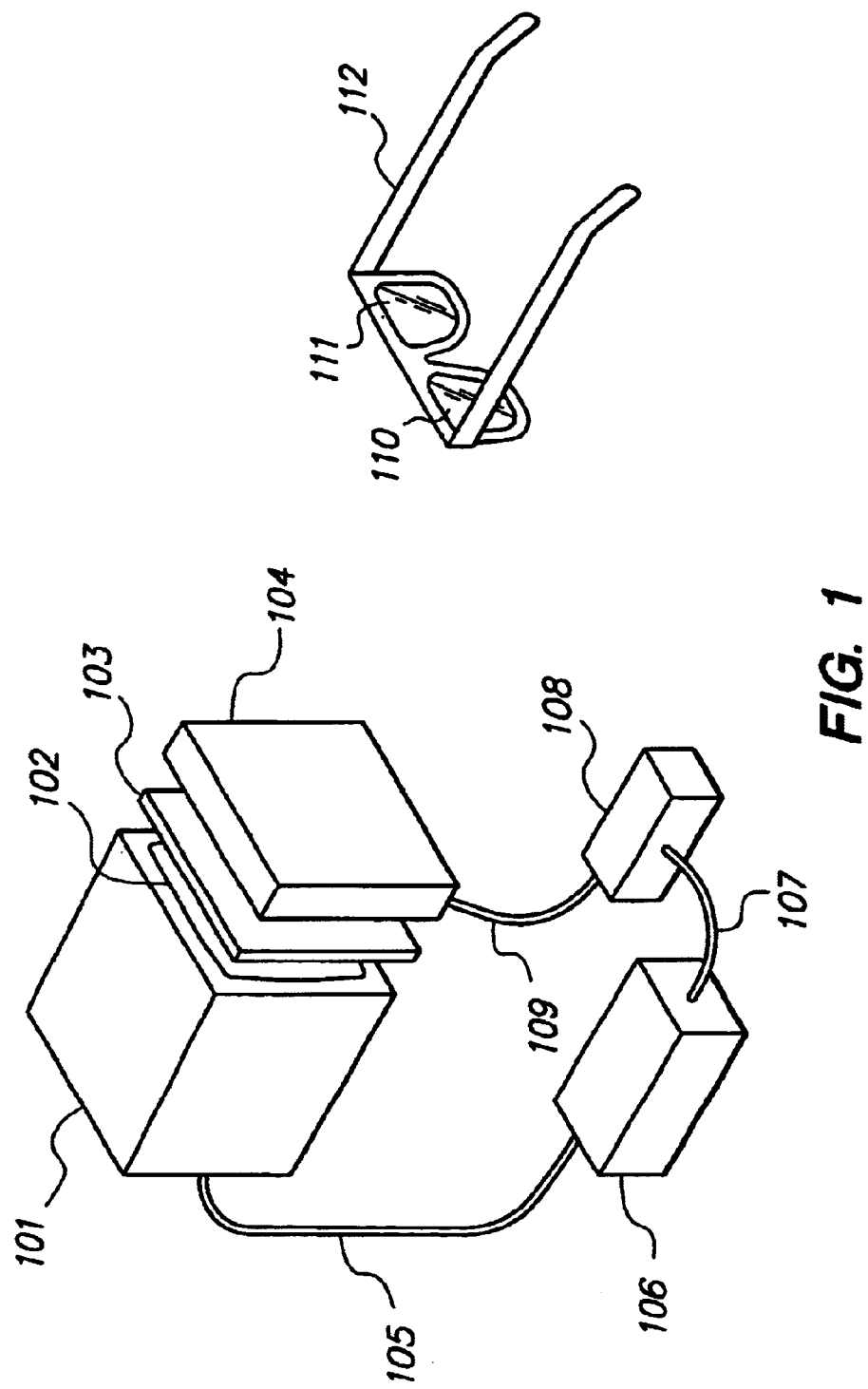
FIG. 1 shows the principal components used for on-screen electro-optical switching of polarization for image selection in a stereoscopic display.

FIG. 1 shows the major components used in the present invention. The display monitor 101 produces an image onto CRT screen 102 in a conventional manner. The light produced by the CRT display 102 is transmitted through circular sheet polarizer 103 and Byatt segmented LC modulator 104 (segments not shown), oriented such that the light emitted by the CRT display is circularly polarized. Image origination device 106, which may be a computer, produces images which are transmitted via cable 105 for display by monitor 101. Video field synchronization information is conveyed from the image origination device 106 via cable 107 to electronics driver 108. The electronics driver 108 produces the waveform shown in FIG. 5. Driver 108 is used to drive the Byatt segmented modulator 104 via cable 109. The Byatt segmented modulator 104 is shown in more detail in FIG. 4.

The image is viewed with passive circular polarizing eyewear 112 with left-handed and right-handed circular polarizers 110 and 111, respectively. Those familiar with the art will understand that the handedness of the circular polarizers may be interchanged and that the modulator 104 may have its polarization characteristics controlled by the phase of the drive signal of driver 108 (see FIG. 5), or by selecting either a left-handed or right-handed circular polarizer for part 103.

When a video field is produced by electronic imaging device 106, it is written on the CRT display screen 102. Video or electronic display signals are made up of a succession of fields and vertical blanking intervals with synchronization pulses. The synchronization pulses are sensed by driver 108 and are used for the synchronization of the signal necessary to drive the segmented shutter 104 in synchrony with the location of the scanning electron beam. The segments of the Byatt shutter 104 are "animated" to follow the beam as it writes on the face of display screen 102 from top to bottom.

In an electronic stereoscopic display that runs at 120 fields per second (a good value for elimination of flicker), the duration of a field is approximately eight milliseconds, so it takes eight milliseconds for the beam to start at the top and scan to the bottom of the screen. The segments of the Byatt shutter 104 are driven in synchrony with the beam so they follow the beam and are actually switched in synchrony with the location of the beam. A more complete description of how the Byatt segmented shutter 104 works will be given in conjunction with the explanation of FIG. 6, but first, the groundwork for a full appreciation of the explanation must be provided.

FIG. 2 is an illustration of the visibility of segments in the prior art modulator. Modulator 201 has, for the purposes of illustration, five segments labeled 202 through 206. Each segment has a boundary between it and the adjacent segment, and these boundaries, which are horizontal lines, are labeled 207 through 210. Shading has been added at the boundaries 207 through 210 to indicate that the individual segments of the prior art device are visible.

We have illustrated the shading effect for one eye only, in particular for the right eye view, given our particular configuration of polarizer, analyzer, and phase of the drive voltage. The shading is as follows: at the boundary of the scribed line, the area of the top segment adjacent to the line shades to a lighter tone, and the area of the lower segment immediately below the boundary is darker and becomes lighter. The other eye, the left eye, has a reversed pattern (not illustrated), in which the top segment shades to a darker area immediately adjacent to the boundary scribe, and the lower segment is lighter in tonality and becomes darker to match the tonality of the entire segment. The effect is visible for just a few millimeters on either side of the boundary line.

FIG. 3 is a representation of the drive waveform which is produced by prior art electronics. For example, in FIG. 1 these electronics are contained within part 108. We see that a carrier is used to modulate the waveform 301, and typically a 2 KHz carrier is employed. In this case, the carrier is driven to plus or minus H volts, where H is typically 15 to 20 volts. Also, in the regions 302 between drive voltage H, the voltage is zero. Or, to use the nomenclature we have chosen here, the bias is zero volts. Observe that the periods for applying voltage and bias are of equal duration.

FIG. 4 is an illustration of the Byatt modulator 401 in accord with the present invention, with five segments labeled 402 through 406. The dotted lines between the segments illustrate that the segments are present but impossible to see, and indeed the shutter appears to be a single integral segment in its entirety.

FIG. 5 is a drawing of the waveform used to drive Byatt modulator 401, and FIG. 8 (discussed below) is a block diagram of the circuit used to produce the waveform. As shown in FIG. 5, the waveform includes portion 501 which has a positive voltage of value +H and portion 503 which has a negative voltage of value −H. Thus, the device is driven between +H and −H volts (typically between 15 and 20 volts). For example, if we drive the shutter at 40 volts peak-to-peak, +H is 20 volts and −H is −20 volts. Each quarter cycle of the waveform has a duration T and each quarter cycle interval is signified by the designations A, B, C, D. The modulator 401 is driven to plus or minus H volts for equal durations T. Waveform portions 502 and 504 are defined as the bias voltage. These intervals B and D are of the same duration T as intervals A and C. The bias voltage for intervals B and D have a value of plus and minus L volts.

There are two major differences between the prior art waveform shown in FIG. 3 and the waveform used in the present invention as shown in FIG. 5. In the present device, there is no carrier. Instead, a bias voltage is used. The lack of carrier modulation results in a lower power requirement, and this has been described in U.S. Pat. No. 4,884,876 entitled Achromatic Liquid Crystal Shutter for Stereoscopic and Other Applications, by Lipton et al.

It is the application of the appropriate bias voltage L, as shown in FIG. 5, that eliminates the visibility of the individual electrode segments. The segments are visible at L=0 volts, as illustrated in FIG. 2, but become invisible with the application of the proper value of bias voltage, as shown in FIG. 4. The application of a bias voltage to a modulator driven with a carrier, as shown in FIG. 3, has the same result, namely the segments disappear as individual entities. In this case the bias voltage is also modulated by the carrier.

We have used a five-segmented shutter having a 5.2 micron LC gap filled with liquid crystal material, such as Merck ZLI-1565. The shutter was driven at plus or minus 18 volts. With a bias voltage of zero volts, the individual segments were visible. However, when a bias voltage of plus or minus 1 volt was applied, the segments as individual entities entirely disappeared; that is, the segments could not be distinguished from one another. This astounding and unexpected result held for bias values up to plus and minus 2 volts. The ability to make the segments appear to be integral, as if they are one single segment, is the difference between a modulator which is merely serviceable, as in the prior art, and one which is excellent, such as the present invention.

The value of the required bias is a function of the value of drive voltage. If the drive voltage is increased, then the bias must accordingly be increased to achieve the beneficial result. Measurements have showed that the speed of the device, from low voltage to high voltage and vice versa, was unaffected with the application of the bias. Transmission and dynamic range as measured with a photometer were similarly more or less constant. Thus, there was no diminution in performance as a result of the application of the bias.

Figures 6, 7:
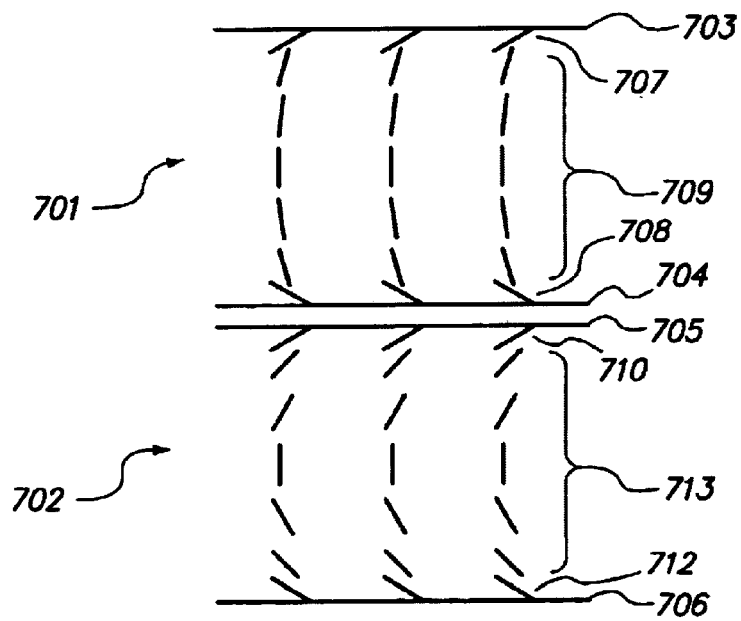
FIG. 6 shows the "animation" sequence for the Byatt multi-segmented shutter.
FIG. 7 illustrates the directors within an LC cell in two different states.

With reference to FIG. 6, we will describe how the Byatt modulator achieves the desired crosstalk reduction. At time T=1, the electron beam (R BEAM) has written the first lines of the right image in segment 1 (segment numbers are given in a column on the left edges of the drawings). The vertical blanking, as noted on the drawing labeled T=1, immediately precedes the first line of the right image. The beam completes writing the right image R in the area of segment 1, in which case segment 1 is in one of two possible states: it is either driven with drive voltage plus or minus H or bias voltage plus or minus L.

For didactic simplification, we will assume segment 1 is being driven at drive voltage H, and we will label this "state 1." In the meantime, segments 2, 3, 4, and 5 are in state 2 (driven at bias voltage L) and continue to show the phosphor afterglow of the previously written left field. At time T=2, both segments 1 and 2 are in state 1, whereas segments 3, 4, and 5 are in state 2. The reader will be able to see by looking at the drawings for T=3, T=4, T=5 and T=6 that similar descriptions can be given but will be omitted here. At T=5, all five segments are showing the right image, and at T=6 the left beam has started to be written in segment 1. At T=6, segment 1 has switched to state 2, and segments 2 through 5, are now in state 1. The cycle continues, and R and L segments are shunted to the appropriate eye because the observer is viewing the image through a selection device made up of left and right handed circular polarizer analyzers.

When viewing images with the technique, as opposed to that used in CrystalEyes or in other shuttering eyewear approaches, both eyes are always seeing an image. The eyes are not alternately occluded; the right eye is seeing a right image as the left eye is seeing a left image. This is not true in shuttering eyewear because the eyes are seeing images out of phase. The important thing here is that the afterglow component of the phosphor-emitted light is transmitted to the appropriate eye. In other words, the left image continues to go to the left eye instead of interfering or mixing with the right eye image and showing up as a ghost-like double exposure. The segmented shutter is thus able to present a vastly improved image by animating the segments in synchrony with the beam location, thereby suppressing the afterglow component which produces ghosting because the afterglow component has been transformed into an image for the appropriate eye.

A good stereoscopic image results despite the fact that, as measured photometrically, this modulator and analyzing eyewear (which together form a shutter) have a relatively low dynamic range. The dynamic range is quite a bit less than the dynamic range one measures with CrystalEyes shutters. Clearly, much of the crosstalk one sees in such a system must originate from phosphor afterglow.

We have described how the segmentation approach reduces crosstalk between left and right eyes. In other words, a segmented shutter is able to suppress the ghost image so that one can see an image which is relatively unencumbered by the artifact. Having created such a benefit, it is a pity that the segments should continue to be visible as individual entities.

Observers assume that they are seeing lines between the segments, when actually the problem is color and density shading within each segment. The abrupt transition from segment to segment creates an optical illusion and seems to define a sharp horizontal line, and as mentioned above, this misperception of the problem lead prior workers in a non-productive direction, namely placing an inordinate emphasis on the reduction of the scribe width between segment electrodes. That is not to say that a thin scribe is not important, because obviously, a wide scribe will be visible even if the segment shading suppression technique described herein is applied.

The following may help to explain what occurs within the cell as bias voltage is applied. With reference to FIG. 7, a π-cell is shown in two states, namely state 701 and state 702. State 701 exists when the n-cell has maximum voltage applied, and state 702 exists when the minimum voltage is applied. This minimum voltage may be zero volts or the bias voltage L, as described above. Elements 703, 704, 705 and 706 refer to the glass walls of the π-cells including the interior ITO electrode coatings (now shown) and director alignment layer coating (not shown). Elements 707, 708, 710 and 712 refer to the directors immediately adjacent to the director alignment layer. The directors are shown throughout the two diagrams as dash-like lines. The director alignment is usually made of polyimide overcoating the ITO layer, which is rubbed or buffed to produce micro-abrasions. The directors (ordered groups of LC molecules) line up according to the rub suggested in the polyimide layer. It is assumed that polarizers are employed on both outside surfaces of the glass walls. The polarizers are aligned with their axes crossed and oriented at 45° to the surface directors.

As previously mentioned, state 701 is the high voltage state and state 702 is the low voltage state. (There is an additional π-cell state in which voltage H has not been applied for some considerable time, say tens of milliseconds. This is the relaxed state and does not concern us here.) The bulk of the LC fluid is shown within brackets labeled 709 and 713. With reference to state 701, the high voltage state, the directors in the bulk 709 are dipoles whose major axes are aligned with the electric field (not shown). The lines of force are perpendicular to the surface of the glass walls 703 and 704, and that is the orientation followed by the major axes of the bulk directors.

In state 702, the low voltage or bias voltage state, tile directors of the bulk 713 are splayed and lined up to a greater extent with the tipped directors at the surface. In the high voltage state 701, there is no phase shift, because there is little opportunity for the surface directors to produce retardation, but in the case of the low voltage state 702, the orientation of the splayed directors in the bulk 713 adjacent to the surface produces sufficient retardation to toggle the axis of transmitted incoming linear polarized light. A similar event occurs in the case of circularly polarized light, but in this case the handedness of the circularly polarized light is reversed.

The application of bias to a surface mode part tunes the phase shift λ of the device, but the phase shift can similarly be tuned by adjusting the thickness of the gap d, or by use of an LC material with a different birefringence Δn. The phase shift is given by the relationship:

$$\lambda = \Delta n d.$$

When $\lambda = \pi$ radians, the axis of linearly polarized light is rotated through 90° and maximum extinction of transmitted light will occur. The phase shift λ may be tuned, if desired, by selecting an LC material with the appropriate Δn, by adjusting the thickness of the film of LC material, gap d, or by applying the proper voltage as described above. In the case of adjusting the bias voltage, the degree of splayedness of the directors in the bulk 713 can be controlled. Clearly, the greater the bias voltage, the more the directors will be aligned as parallel to the applied electric field as they would be in the on state. Thus it is possible to tune the retardation or phase shift of the cell in the low voltage state by varying the bias voltage.

What is happening to achieve the reduction of shading within each segment, and how does one tune the phase shift? Unfortunately, the linkage between the application of the bias and the disappearance of the segments is obscure. Surely the mechanism is related to the change in director orientation and the amount of phase shift. It is probable that the desired result can also be achieved by changing the phase shift related parameters given above. While it is true that we have established that the desired result is produced by the application of bias, varying the other parameters appropriately might also eliminate the segments as individual visible entities. However, only the application of bias can be smoothly and continuously varied, unlike the other parameters which must be varied discretely, and would also require building individual cells with incrementally varying parameters.

With regard to the tuning of the device, the best way to do so is empirically. A test target of continuous textureless background is displayed on the CRT, and the bias voltage is varied. Once the visible segments of the Byatt modulator are eliminated, the desired result has been achieved.

Figure 8:
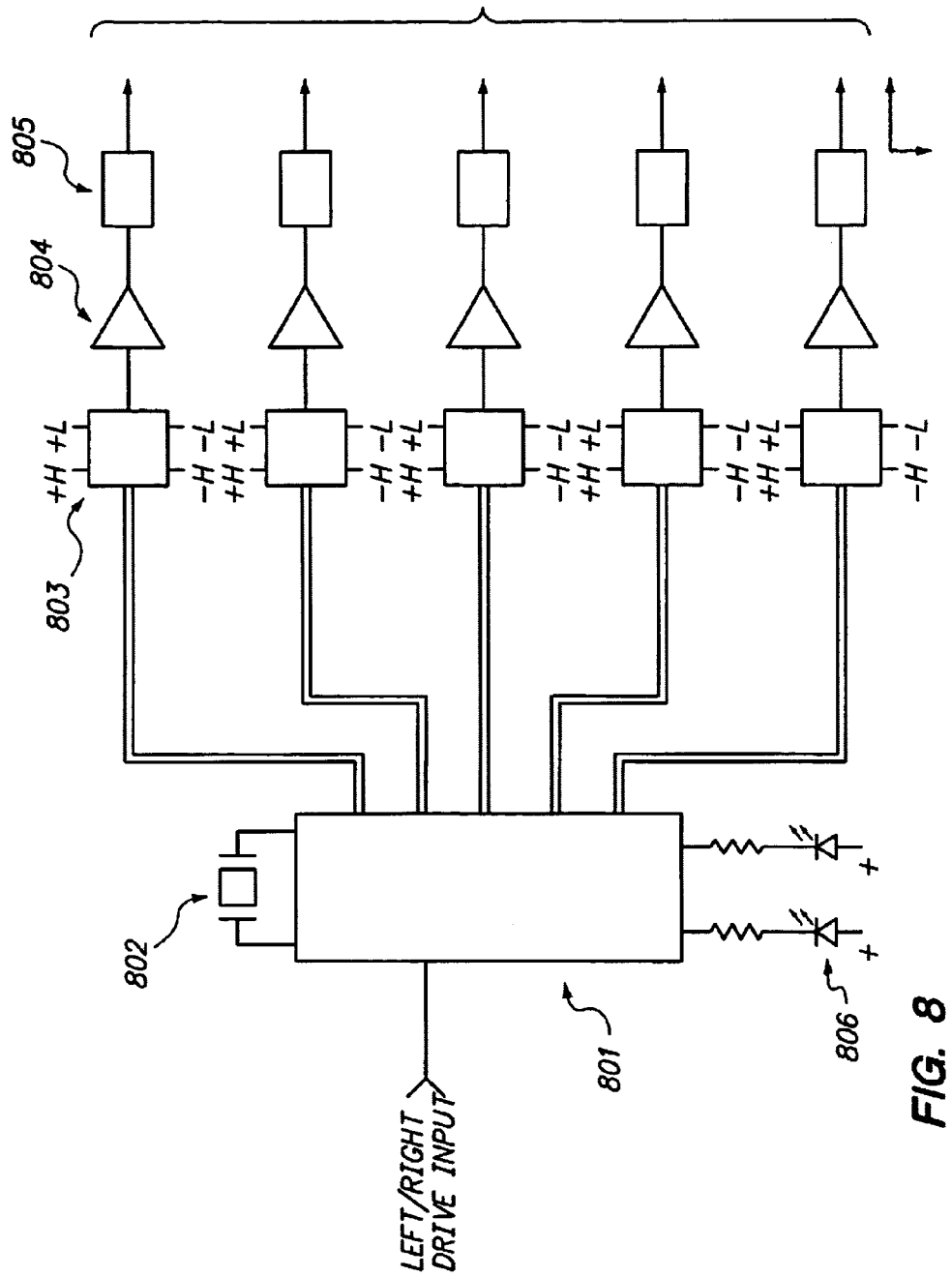
FIG. 8 is a block diagram of the LC driver electronics of the present invention.

With reference to FIG. 8, the drive electronics circuit is illustrated. The circuit receives as its input a Left/Right drive signal that is high when a left eye image is visible and low when a right eye image is visible. This signal is processed by a single-chip microcomputer (MCU) 801, such as a Motorola MC68HC05. The input signal switches coincident with tile vertical sync pulse. Normally this is at or very near the beginning of the vertical blanking interval. After the blanking interval comes the active video, and the pattern repeats.

The MCU 801 is interrupted by edges of the input signal. Using the on-chip timing resources, the MCU measures the time between these edges. The accuracy of this timing is a function of the frequency of crystal 802, in this case 8 MHz, which results in a basing time-keeping accuracy of 1 μsec. The MCU is thus executing a software Phase-Locked-Loop (PLL).

Once the internal timing is established, the MCU 801 uses this information to create the appropriate transition points for each segment. First, the field time is calculated. This is the length of time between transitions of the input signal. Second, the blanking time is calculated at 1/16 of the field time. This value is an acceptable approximation for all resolutions and display modes in common use. Next, the segment time is calculated at three times the blanking time or 3/16 of the field time. The total field is 1/16 blanking plus five time 3/16 segments.

In this case, each segment should be driven to its proper state approximately 2 msec before the beam sweeps past the beginning of the displayed segment area. This selected value of 2 msec is a function of the optical transition speed of the LC polarizer. Thus, the first segment must switch at 2 msec minus the blanking time before the input signal edge. Likewise, the second segment switches 3/16 of the field time later, and so on.

Transmigration is a damaging deterioration of the cell which occurs when the net average DC level applied across the cell is not zero. For each msec that the cell has a voltage of positive H volts applied across it, there must be a msec where the cell has negative H applied across it. This also applies to the low bias voltage. In the waveform shown in FIG. 5, regions 501 and 504 are positive voltages and regions 502 and 503 are negative voltages. Four fields are required before the waveform applied to the cell repeats.

The MCU 801 outputs two status bits per segment, namely an on/off bit and a polarity bit. Each segment has a driver circuit consisting of a 4:1 analog multiplexor 803, an amplifier 804, and a filter 805. The 4:1 MUX 803 takes the two status bits and routes one of four analog voltages into the amplifier 804.

Normal operating voltages for the LC polarizer are in the area of 40 volts peak-to-peak. Thus, the high and low operating voltages the amplifier 804 is required to deliver to the cell are +20 and −20 volts. The MUX 803 would have to switch these voltages. However, if the amplifier is given a gain of −10, then the MUX only needs to switch voltages of +2 and −2 Volts. This allows the use of a much less expensive multiplexor while having a tiny increase in the cost of the amplifier circuit. In this case, the amplifier gain is −10 and the four voltages switched by the MUX are: −1.8V (corresponding to 501 in FIG. 5); +100 mV (corresponding to 502 in FIG. 5); +1.8V (corresponding to 503 in FIG. 5); and −100 mV (corresponding to 504 in FIG. 5).

The output of the amplifier is filtered before reaching the LC polarizing panel. Low-pass filters 805 are used to suppress emissions for regulatory certification purposes rather than to have an effect on the LC polarizing panel.

Status indicators 806 are controlled by MCU 801 to indicate the status of the unit (i.e. power on, input signal detected, etc.) and, when flashing, to indicate errors (i.e. input unstable, duty cycle not 50%, frequency out of range, etc.).

We have established that by applying the proper bias voltage value, or possibly by tuning the retardation or phase shift of the cell by any one of several means as specified above, the shading of individual segments is entirely eliminated, and thus the individual segments cannot be seen. Thus, the benefit of the Byatt shutter, in terms of its ability to suppress ghosting may be fully enjoyed, while the visibility of the individual segments is entirely suppressed.

What is claimed is:

1. In an electronic stereoscopic display system of the type wherein images are sequentially scanned across an electronic display, wherein the display, a polarizing sheet and a modulator are held in juxtaposition and observed by a user with polarizing eyewear, wherein the modulator includes a plurality of segments each having liquid crystal material and arranged contiguously in a direction of the sequential scan, and wherein each segment is selectively driven in correspondence with the scan by applying and removing a drive voltage to drive the liquid crystal to a high state and a low state, respectively, wherein the improvement comprises tuning the phase shift of each liquid crystal to eliminate the perception of visible lines between the segments.

2. An electronic stereoscopic display system as in claim 1, wherein the phase shift is tuned by applying a bias voltage to drive the liquid crystal in its low state.

3. An electronic stereoscopic display system as in claim 1, wherein the phase shift is tuned by selecting a liquid crystal material having a different birefringence.

4. An electronic stereoscopic display system as in claim 1, wherein the phase shift is tuned by adjusting a gap thickness of the liquid crystal material.

5. An electronic stereoscopic display system as in claim 2, wherein each segment is driven with the drive voltage to its high state in synchrony with the scan for a selected eye.

6. An electronic stereoscopic display system as in claim 5, wherein each segment is driven with the bias voltage to its low state in synchrony with the scan for a non-selected eye.

7. An electronic stereoscopic display system as in claim 1, wherein the bias voltage is a proportional fraction of the drive voltage.

8. A polarizing modulator for an electronic stereoscopic display system having a sequentially scanning display, comprising:

a plurality of segments each containing liquid crystal material and arranged contiguously in a direction of the sequential scan, and driving circuitry coupled to each segment and adapted to drive each segment to a high state with a drive voltage and to a low state with a bias voltage such that an optical artifact creating a perception of visible lines between the segments is eliminated.

9. A polarizing modulator as in claim 8, wherein each segment is driven with the drive voltage to its high state in synchrony with the scan for a selected eye and wherein each segment is driven with the bias voltage to its low state in synchrony with the scan for a non-selected eye.

10. An electronic stereoscopic display system as in claim 8, wherein the bias voltage is a proportional fraction of the drive voltage.

11. An electronic stereoscopic display system as in claim 8, further comprising a circuit adapted for varying the bias voltage.

12. A drive circuit for a modulator in an electronic stereoscopic display system having a sequentially scanning display, wherein the modulator includes a plurality of segments each containing liquid crystal material and arranged contiguously in a direction of the sequential scan, comprising:

a plurality of amplifiers each coupled to drive a respective segment, and a plurality of multiplexors each coupled to a respective amplifier and each selecting one of four voltages to provide to the amplifier in response to two control inputs from a controller, said four voltages being a drive voltage of positive polarity, a drive voltage of negative polarity, a bias voltage of positive polarity and a bias voltage of negative polarity, said controller comprising:

a circuit receiving a scan signal from the display system, wherein the scan signal is in a high state when one image perspective is visible and a low state when another image perspective is visible, an oscillating crystal, and a circuit calculating timing and generating said two control inputs based on the transition of the scan signal between high and low states, wherein a first of the control inputs is set to one state to select a drive voltage and another state to select a bias voltage, and wherein a second of the control inputs is set to one state to select a positive polarity and to another state to select a negative polarity.

13. A drive circuit as in claim 12 wherein the timing calculating circuit defines a field time as the length of time between transitions of the scan signal, a blanking time as a fraction of the field time and a segment time as a fraction of the field time, and wherein the control inputs are generated to drive each segment in correspondence with the sequential scan for each image perspective.

14. A drive circuit as in claim 13, wherein the modulator includes five segments, and wherein the blanking time is defined as 1/16 of the field time and the segment time is defined as 3/16 of the field time, and wherein the control inputs are generated to drive each segment in correspondence with the sequential scan for each perspective image.

15. A drive circuit as in claim 14, wherein the control inputs are generated to drive each segment just prior to the corresponding sequential scan for each perspective image.

16. A drive circuit as in claim 15, wherein the control inputs are generated to drive each segment approximately two milliseconds prior to the corresponding sequential scan for each perspective image.

* * * * *